UNITED STATES PATENT OFFICE.

CHARLES F. HOOD, OF CONNELLSVILLE, PENNSYLVANIA, ASSIGNOR TO MARIA L. HOOD, OF SAME PLACE, AND JOHN B. BOOTH, OF SEWICKLEY, PENNSYLVANIA.

BRIQUET.

SPECIFICATION forming part of Letters Patent No. 645,361, dated March 13, 1900.

Application filed November 6, 1899. Serial No. 735,957. (No specimens.)

*To all whom it may concern:*

Be it known that I, CHARLES F. HOOD, a citizen of the United States, residing at Connellsville, in the county of Fayette and State of Pennsylvania, have invented or discovered certain new and useful Improvements in Briquets, of which improvements the following is a specification.

The invention described herein relates to certain improvements in the manufacture of briquets from coal, coke, or other material, and has for its object the provision of a binder which will not become impaired on exposure, as the briquet is protected by a glazed surface formed during the baking operation.

In the practice of my invention I employ a highly-inflammable liquid material, such as molasses or glucose, having high adhesive qualities, mingled with a solid material, such as starch, also inflammable and highly adhesive when mixed with a liquid. A mixture of these materials is added while in a heated condition to granular or powdered material and thoroughly stirred in, so that each grain or portion of the mineral is thoroughly coated. The prepared material is then placed in suitable molds and subjected to a high pressure, thereby forming dense solid blocks, which are then dried in any suitable manner, but preferably in an oven, where they are subjected to such a heat that surface coating of binder will form a glaze on the surface of the block.

While the proportions of the ingredients may be varied, I have produced very good results from a mixture consisting of thirty (30) pounds of low-grade centrifugal molasses or forty (40) pounds of commercial glucose, three (3) pounds of starch, and one hundred and ten (110) pounds of water. In preparing these materials the starch is mixed with a sufficient portion of the water to form a liquid paste, which is then added, with the remaining quantity of water, to the molasses. These materials are then thoroughly stirred together and heated to a boiling-point. While still in a heated condition the binding mixture is added to the granular or powdered mineral in about the proportions of seven (7) pounds of the mixture to one hundred (100) pounds of the mineral. After and preferably during the addition of the binder the mineral is stirred, a pug-mill being preferably employed for that purpose, so as to insure the coating of the grains of mineral with the binder. The coated mineral is then placed in suitable molds and subjected to a high pressure, so as to produce dense solid blocks. The blocks are then dried, preferably in suitable ovens, where they may be subjected to sufficient heat to cause the binder to form a glaze over the surface of the blocks, thereby rendering them waterproof.

By increasing the quantity of molasses or glucose the briquets may be rendered more inflammable.

In order to prevent any fermentation and consequent deterioration of the binder, I have found it desirable to add thereto an antifermenting ingredient, preferably one which will have some binding qualities, such as lime. The lime is added in the form of lime-water, which is prepared by pouring water over quicklime, the excess of water being poured off. This lime-water is added in about the proportion of ten (10) pounds to the quantities of the other ingredients before stated. The lime-water may displace an equal quantity of water in the mixture.

I claim herein as my invention—

1. A binder for briquets, consisting of molasses, starch and water in substantially the proportions stated.

2. A binder for briquets, consisting of molasses, starch, water and an antifermenting material in substantially the proportions stated.

3. A binder for briquets, consisting of molasses, starch, lime-water, in substantially the proportions stated.

In testimony whereof I have hereunto set my hand.

CHARLES F. HOOD.

Witnesses:
DARWIN S. WOLCOTT,
F. E. GAITHER.